May 24, 1960 L. J. BERGGREN ET AL 2,937,405
PLASTIC INJECTION MOLDING MACHINES
Filed Feb. 11, 1957 6 Sheets-Sheet 1

Inventors
Loring J. Berggren
Adolph S. Dorosz
James F. Leahy
By their Attorney

May 24, 1960 L. J. BERGGREN ET AL 2,937,405
PLASTIC INJECTION MOLDING MACHINES
Filed Feb. 11, 1957 6 Sheets-Sheet 2
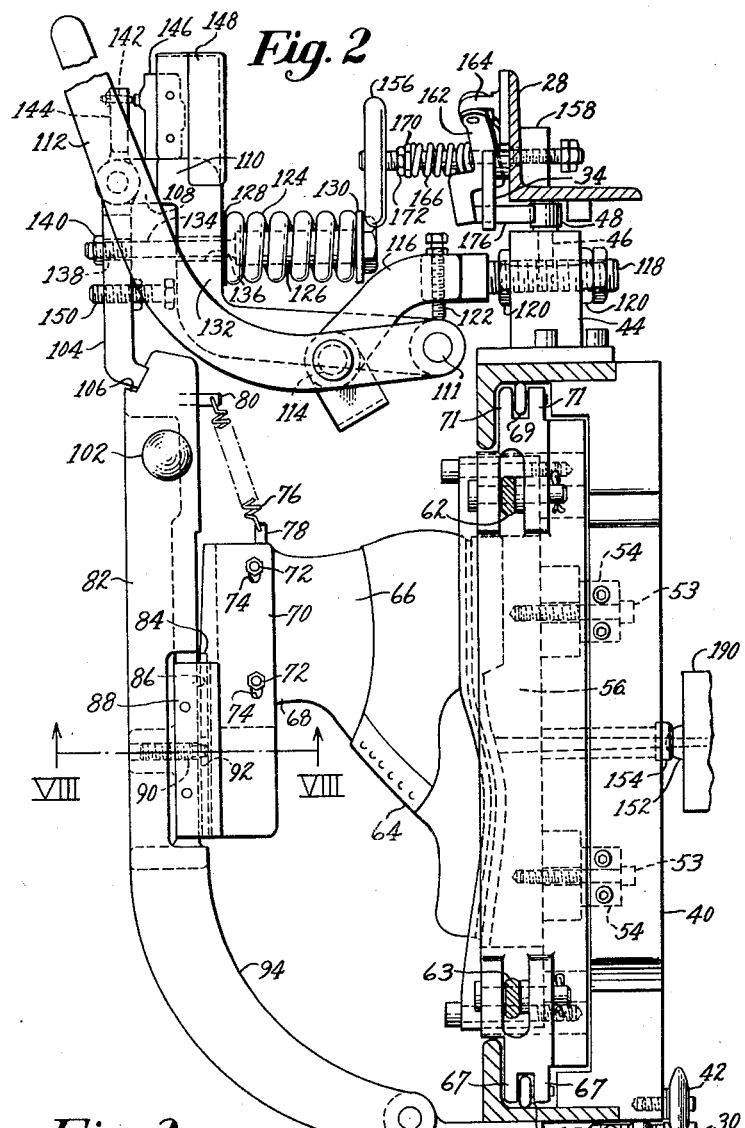
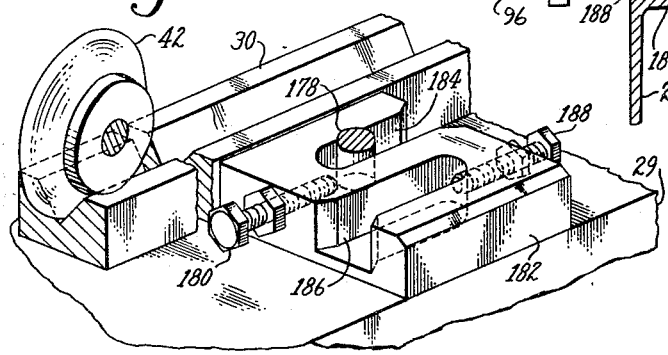
Inventors
Loring J. Berggren
Adolph S. Dorosz
James F. Leahy
By their Attorney Inventors
Loring J. Berggren
Adolph S. Dorosz
James F. Leahy
By their Attorney May 24, 1960   L. J. BERGGREN ET AL   2,937,405
PLASTIC INJECTION MOLDING MACHINES
Filed Feb. 11, 1957                                             6 Sheets-Sheet 4

*Inventors*
Loring J. Berggren
Adolph S. Dorosz
James F. Leahy
By their Attorney May 24, 1960   L. J. BERGGREN ET AL   2,937,405
PLASTIC INJECTION MOLDING MACHINES
Filed Feb. 11, 1957   6 Sheets-Sheet 5

Inventors
Loring J. Berggren
Adolph S. Dorosz
James F. Leahy
By their Attorney

May 24, 1960 L. J. BERGGREN ET AL 2,937,405
PLASTIC INJECTION MOLDING MACHINES
Filed Feb. 11, 1957 6 Sheets-Sheet 6

Inventors
Loring J. Berggren
Adolph S. Dorosz
James F. Leahy
By their Attorney

United States Patent Office 2,937,405
Patented May 24, 1960

2,937,405

PLASTIC INJECTION MOLDING MACHINES

Loring J. Berggren, Adolph S. Dorosz, and James F. Leahy, Beverly, Mass., assignors to United Shoe Machinery Corporation, Flemington, N.J., and Boston, Mass., a corporation of New Jersey Filed Feb. 11, 1957, Ser. No. 639,279

6 Claims. (Cl. 18—30)

This invention relates to plastic injection molding machines and is herein illustrated in its application to machines for molding and attaching sole and heel units to the bottoms of lasted shoe uppers. The machine of the present invention is similar in certain respects to the machine disclosed in United States Letters Patent No. 2,589,323, granted March 18, 1952, on an application filed in the names of Ashley and Leahy.

It is an object of the present invention to provide an improved plastic injection molding machine which is simple in construction and economical in operation and particularly effective for use in the molding and attaching of shoe bottom members to lasted shoe uppers.

In one aspect thereof the present invention contemplates the provision in a plastic injection molding machine of a support for a lasted shoe upper, hereinafter referred to for convenience as a shoe, mold elements providing a cavity defining the shape of a shoe bottom member, a rail upon which the mold elements and the shoe support move as a unit from a loading station to a molding station, suitable means for forcibly injecting fluid plastic into the mold cavity, means at the molding station for swinging the mold elements and the shoe support as a unit into position to receive fluid from an injecting means, the rail serving as a fulcrum for such swinging movement, and means operated by the fluid injecting force to move a shoe on the support heightwise thereof relatively to the mold elements thereby to effect the termination of the injecting operation.

For urging the shoe carrier in a direction to clamp a shoe thereon against the mold members, the illustrated machine is provided with a latch lever which acts on the carrier and a hand lever for operatnig the latch lever in order to apply clamping pressure to the carrier. The illustrated latch lever operates in response to a movement of the shoe by the fluid pressure in the mold cavity to operate a microswitch to cause the termination of the mold charging operation.

In the illustrated organization, the advancement of the ambulatory assembly into the injection station brings a sprue member mounted in the sole mold member into engagement with the plastic injecting nozzle preparatory to the mold charging operation.

These and other features of the invention will now be described with reference to the accompanying drawings and pointed out in the appended claims.

In the drawings,

Fig. 2 is an enlarged view in right side elevation illustrating the shoe supporting assembly in the molding station with a shoe on the support presented to the mold members;

Fig. 3 is a greatly enlarged perspective view illustrating certain parts partially shown in Fig. 2;

Figure 1:
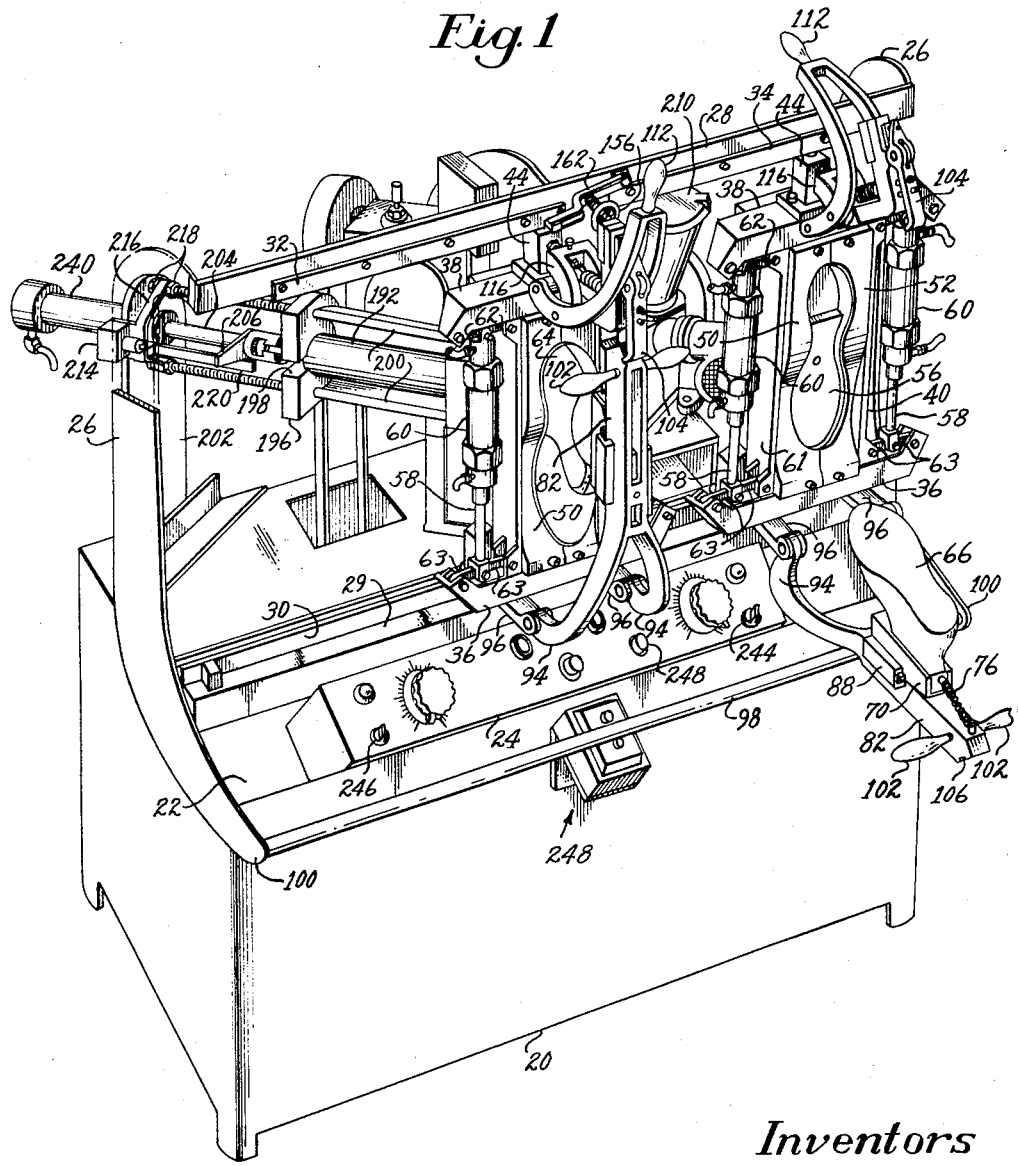
Fig. 1 is a perspective view of a machine embodying the features of the present invention.

The invention is illustrated in the drawings as embodied in a machine for molding and attaching outsoles to the bottoms of lasted shoe uppers. The machine is provided with two assemblies each comprising a support for a shoe form, a pair of mold elements and a carriage in which the mold elements are movable between an open and a closed position and on which the work support is mounted for swinging movement to present a shoe on the form to the molds. The carriages are movable on suitable rails between separate loading stations and a common molding station. In the illustrated organization the molding station is in the center of the machine and the loading station for one of the carriages is at the right side of the machine and the loading station for the other carriage is at the left side of the machine. For injecting into the mold cavity a suitable resin which has been heated to a fluid state the illustrated machine is provided with an extruder in the form of a suitable conveyor screw mounted in a cylinder and arranged to communicate with a mold loading injector comprising a cylinder which communicates with an injection nozzle and a hydraulically operated piston mounted in the cylinder.

Figure 7:
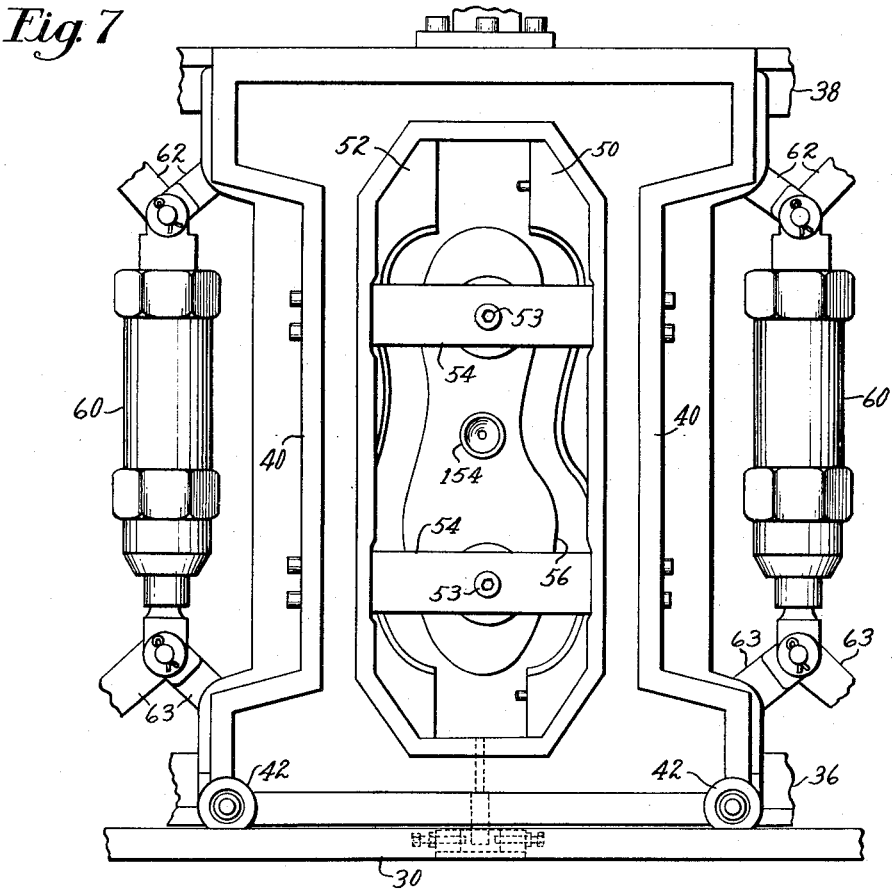
Fig. 7 is a rear elevation of the mold assembly.

Referring to Fig. 1, the illustrated machine comprises a cabinet 20 containing the power plant and having mounted on an inclined forward surface 22 a panel or box 24 on which the various control devices and pilot lights are conveniently arranged. Secured to and extending upwardly from the opposite end portions of the cabinet are plates or standards 26 having forwardly curved upper end portions to which are secured the opposite ends of a horizontal rail 28 of angle iron construction. Secured to an angle iron frame member 29 just in back of the inclined portion 22 is a horizontal channel rail 30 extending the full width of the cabinet. Secured to and spaced forwardly from the rail 28 are two guide rails 32 and 34 which are spaced apart from each other at the center of the machine for a reason hereinafter explained. The channel rail 30 and the two guide rails 32 and 34 serve as the means for mounting two carriages for movement between a loading station and a molding station. In the illustrated organization the two carriages have a common molding station at the center of the machine widthwise thereof and separate loading stations at opposite sides of the molding station. The carriages, which are identical in construction, each comprises a lower channel member 36 arranged in upright position, an upper channel member 38 arranged in inverted position and a generally rectangular frame member 40 (Fig. 7) to which the channel members are secured. The lower channel member 36 is provided with two rollers 42 which travel in the channel rail 30, and the upper channel member 38 has a block 44 (Fig. 2) projecting upwardly therefrom and carrying, on an upwardly extending pin 46, a roller 48 which normally engages one of the guide rails 32, 34. Mounted for lateral movement toward and from each other in the channel members 36 and 38 are two side mold members 50 and 52, and secured by screws 53 to horizontal bars 54

(Fig. 7) fixed to the frame 40 and traversing a central opening therein is a sole shaped plate 56 forming the base of the mold. For opening and closing the side mold members 50 and 52 suitable pneumatic devices are incorporated in the two ambulatory assemblies, one at each side of the pair of side mold members. Each pneumatic device comprises a piston 58 operating in a cylinder 60, the cylinder being pivotally mounted at the common axis of two toggle links 62 mounted in the upper channel member 38 and the piston 58 in like manner being pivotally mounted at the common axis of two toggle links 63 mounted in the lower channel member 36. In each case the outer toggle link is pivotally connected to the channel member and the inner toggle link is pivotally mounted between ears projecting outwardly from a vertically disposed member 61 which carries the adjacent side mold member. To facilitate the movement of the member 61 it is provided with bottom rollers 65 pivoted between lugs 67 and upper rollers 69 pivoted between lugs 71. It will be seen that the operation of the pistons 58 to straighten the toggle links closes the side mold members 50 and 52 and the reverse operation of the piston breaks the toggle links and opens the side mold members. In each of the carriages a suitable manually operated pneumatic valve (not shown) is provided for effecting the operation of the pistons.

Figure 8:
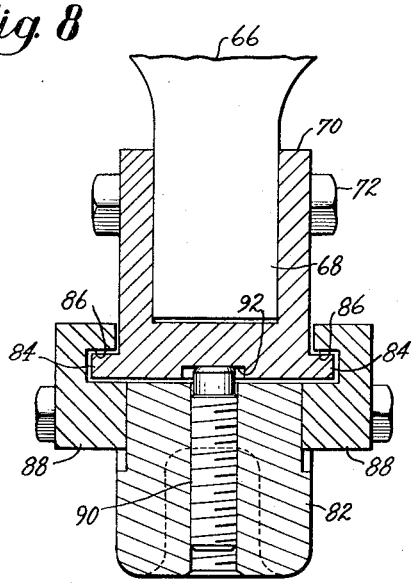
Fig. 8 is a greatly enlarged sectional view taken substantially on the line VIII—VIII of Fig. 2.

Referring to Fig. 2, a shoe upper 64, which has been lasted to an insole and coated along its lasted margin with an adhesive suitable for the attachment of an outsole to be molded thereon is mounted on a metal shoe form 66 having a shank portion which is mounted in a channel member 70 and removably secured therein by bolts 72 extending through slots 74 in the channel member. It will be understood that there are two such shoe forms, one for each of the ambulatory assemblies. The channel member is urged heelwardly of the shoe form by a spring 76 anchored at one end to a pin 78 projecting from the shoe form and at the other end to a pin 80 anchored to a jack member or arm 82. The channel member 70 has oppositely extending tongues 84 (Fig. 8) mounted in grooves 86 formed in retaining plates 88 fixed to opposite sides of the arm 82. The grooves 86 are substantially larger than the tongues 84 in directions both heightwise and widthwise of the shoe form 66 thus permitting freedom of movement of the shoe form sufficient to permit the accurate registration of the shoe thereon with the side mold members 50 and 52. The channel member 70 is positioned endwise by a pin 90 fixed to the arm 82 and extending heightwise of the shoe form 66 into a groove 92 formed in the base of the channel member and affording a limited freedom of movement of the channel member relatively to the retaining plates. The jack member or arm 82 has curved portions 94 (Fig. 1) diverging from its central portion and pivotally connected at their ends to lugs 96 fixed to and projecting forwardly from the channel member 36. In its rest position, as shown at the right in Fig. 1, the arm 82 rests upon a horizontal bar 98 with the shoe form 66 bottom upward. The horizontal bar is secured at its ends to curved forward extensions 100 of the standards 26. For manually swinging the jack assembly comprising the arm 82 and the shoe supporting organization upwardly into its position shown at the center, or molding station in Fig. 1 the free end portion of the arm 82 is provided with oppositely extending handles 102. For securing the jack assembly in its elevated position with the shoe 64 in registration with the side mold members 50 and 52 the illustrated machine is provided with a latch mechanism illustrated in Fig. 2 comprising a latch lever 104 which, in its operative position, has its rearwardly bent lower end portion seated in a notch 106 formed in the free end portion of the arm 82. To provide for the pivotal mounting of the latch lever 104, it is slotted to receive a lug 108 projecting forwardly from a bent arm 110 the rear end portion of which is pivotally mounted at 111 between the ends of the diverging arms of a hand lever 112 pivotally mounted forwardly of its rear ends on a cross pin 114 mounted in and projecting outwardly from the forwardly and downwardly extending arms of a yoke 116. For mounting the yoke 116 in a horizontal bore in the block 44 the yoke has a threaded stem 118 extending rearwardly therefrom, and the stem carries clamping nuts 120 for securing the yoke to the block. The normal rest position of the latch assembly is indicated by the showing of the assembly at the right side of Fig. 1 and the operative position is indicated by the showing of the assembly at the center of Fig. 1 and also in Fig. 2. It will be seen that in its rest position the hand lever 112 is at the limit of its upward and rearward movement. After the arm 82 has been swung upwardly to bring the shoe 64 into registration with the side mold members, as shown in Fig. 2, the hand lever 112 is swung downwardly or in a counterclockwise direction, as seen in Fig. 2, to cause the bent end portion of the latch lever 104 to enter the notch 106 in the then upper end portion of the arm 82. After the latch lever engages the arm the counterclockwise movement of the hand lever 112 continues until the hub at the right end portion of the arm 110 engages a stop screw 122 mounted in the cross portion of the yoke 116. The continued operation of the hand lever 112 after the latch lever 104 engages the arm 82, causes the latch lever to swing to a limited extent in a clockwise direction, as seen in Fig. 2, thereby compressing or loading a spring 124 surrounding the enlarged shank portion of a bolt 126 and confined between washers 128 and 130 mounted on the bolt, the former bearing against a vertical intermediate portion 132 of the bent arm 110 and the latter bearing against the head of the bolt. The reduced stem 134 of the bolt 126 extends freely through a bore 136 in the vertical portion 132 of the bent arm, and its threaded end portion extends freely through a bore 138 in the latch lever 104 and is provided with a nut 140 which bears against the forward surface of the latch lever. During the latter part of the counterclockwise movement of the hand lever 112 the pivot of the bent arm 110 passes through a dead center position relatively to the pin 114 thus permitting the spring 124 to maintain the position of the latch assembly illustrated in Fig. 2 after the operator releases his hold on the hand lever 112. In this position of the latch assembly the expansive force of the spring 124 is brought to bear against the latch lever 104 urging it in a counterclockwise direction, as seen in Fig. 2, and thus acting on the arm 82 to maintain the registration of the shoe 64 with the side mold members. The expansive force of the spring 124 is sufficient to hold the shoe against forward movement during the filling of the mold but continued pressure of the fluid injecting piston after the mold has been filled overcomes the force of the spring 124 and moves the shoe forwardly relatively to the side mold members thus effecting a slight clockwise movement of the latch lever 104 and causing a screw 142 mounted in an upward extension 144 of the latch lever to operate a microswitch 146 mounted in a housing formed in an upward extension 148 of the bent arm 110 thereby causing the operation of mechanism hereinafter described to effect the termination of the advancement of the fluid injecting piston. The movement of the shoe 64 relatively to the side molds to effect the operation of the microswitch 146 is very slight, probably not more than five thousandths of an inch, and in any event not sufficient to break the junction of the shoe with the side molds sufficiently to cause the escape of fluid between the side molds and the shoe. The fact that the mold members are cold further contributes to the prevention of the escape of fluid between the side mold members and the shoe by causing the formation of a skin on the fluid resin in the mold cavity before the shoe is moved relatively to the side mold members to operate the microswitch. When the latch assembly is in its rest position the normal disposition of the latch lever 104 relatively to the bent arm 110 is determined by the engagement of an abutment screw 150 carried by the latch lever with the vertical portion 132 of the bent arm 110.

Figure 4:
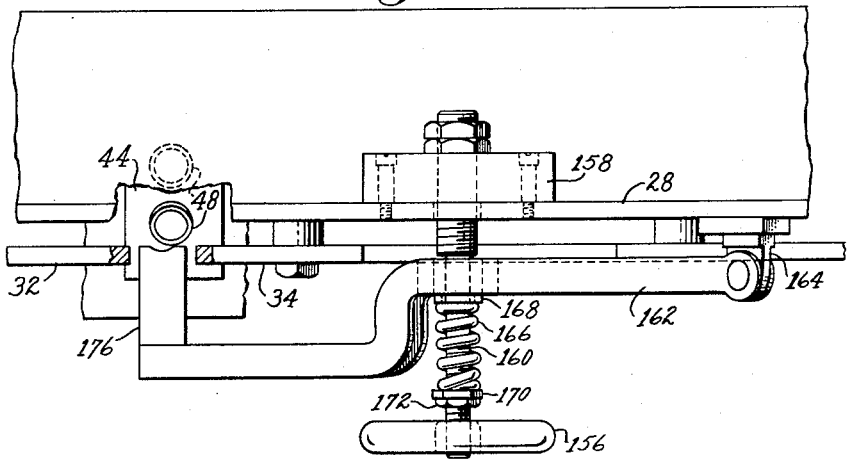
Fig. 4 is an enlarged plan view illustrating mechanism for bringing the mold assembly into communication with the injection nozzle.
Figure 5:
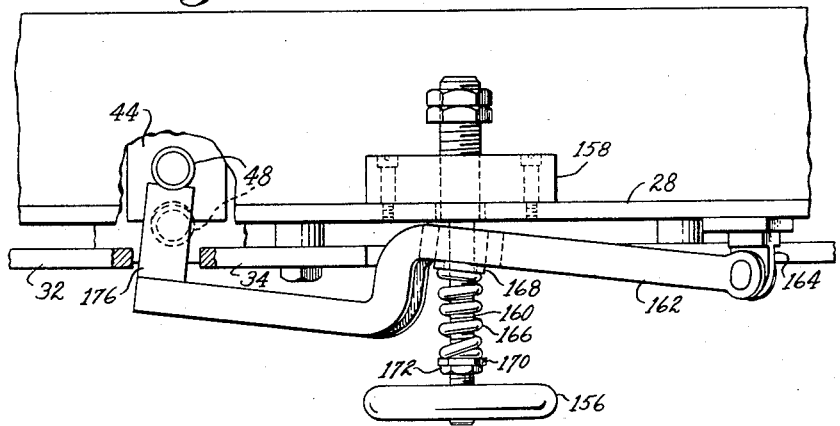
Fig. 5 is a plan view showing the mold positioning mechanism in a position different from that illustrated in Fig. 4.
Figure 6:
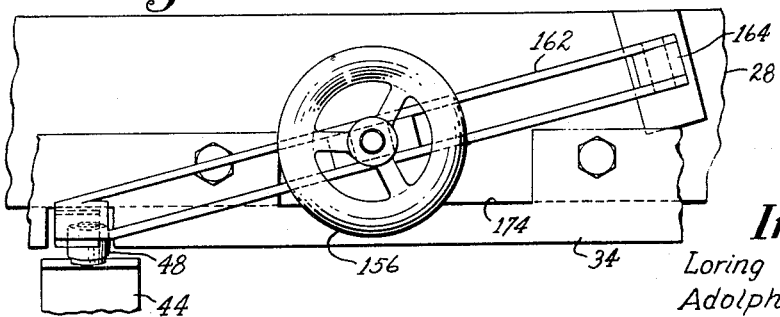
Fig. 6 is a front elevation of the mold positioning mechanism illustrated in Figs. 4 and 5.

As shown in Fig. 2, fluid resin is transmitted to the mold cavity through a nozzle 152 which communicates with a sprue member or tube 154 projecting rearwardly from the sole-shaped mold member 56. When the ambulatory assembly is advanced widthwise of the machine into the molding station the nozzle 152 and the tube 154 are spaced from each other to the extent required to permit the concave end portion of the tube 154 to clear the complementally shaped convex end portion of the nozzle. After the ambulatory assembly has been advanced into the molding station to bring the tube 154 into registration with the nozzle the entire assembly is swung rearwardly about the point of contact of the rolls 42 with the channel rail 30 in order to bring the tube into its nozzle contacting position shown in Fig. 2. Referring to Fig. 6, such movement of the ambulatory assembly is effected by clockwise movement of a hand screw 156. Referring to Figs. 4 and 5, the hand screw has threaded engagement in a tapped hole in a block 158 secured to the rear face of the rail 28. The reduced forward portion 160 of the hand screw extends through a suitable opening in a bent lever 162 fulcrumed at its right end on a lug 164 projecting forwardly from the rail 28. The operation of the hand screw swings the lever 162 in a clockwise direction, as seen in Fig. 4, operating through a spring 166 surrounding the forward portion 160 of the hand screw and confined between a washer 168 which bears against the lever 162 and a washer 170 which bears against a nut 172 mounted on the forward portion of the hand screw. To provide clearance between the lever 162 and the guide rail 34 the guide rail is provided with a notch 174 adjacent to the central portion of the lever 162 through which the hand screw extends and the left end portion of the lever is offset forwardly from the left end portion of the guide rail. At its free end the lever 162 carries a thrust member or finger 176 extending rearwardly through the space between the guide rails 32 and 34. When the ambulatory assembly has been advanced into the molding station the roller 48 at the uper extremity of the carriage is in registration with the finger 176. The operation of the hand screw swings the lever 162 in a clockwise direction from its position in Fig. 4 to its position in Fig. 5, swinging the ambulatory assembly rearwardly and bringing the concave end portion of the tube 154 forcibly into contact with the complementally shaped convex end portion of the nozzle 152. The spring 166 maintains contact between the nozzle and the tube during the injecting operation and also permits the separation of the tube from the nozzle by the plastic injecting force in the event that the microswitch 146 fails to operate to terminate the operation of the fluid injecting piston after the mold has been filled. In order to insure an accurate registration of the tube 154 with the nozzle 152, suitable means is provided for determining the position of each ambulatory assembly at the molding station. Referring to Fig. 3, the ambulatory assembly at the right side of the machine is arrested in the molding station by the engagement of a pin 178 projecting downwardly from the lower channel member 36 with the end of a screw 180 mounted in a block 182 secured to the angle iron member 29. In order to permit the block 182 to take the thrust exerted upon the ambulatory assembly during the fluid injecting operation, the block is provided with an open ended slot 184 which receives the pin 178. It will be understood that the roller 48 (Fig. 2), by its engagement with the finger 176, takes the thrust exerted upon the upper portion of the ambulatory assembly. As shown in Fig. 3, the block 182 is provided in its forward portion with a slot 186 which is open at its left end to receive a pin projecting downwardly from the ambulatory assembly at the left side of the machine and a screw 188 projecting into the right end portion of the slot 186 performs the same function for the ambulatory assembly at the left side of the machine as the screw 180 performs for the ambulatory assembly at the right side of the machine.

Figure 9:
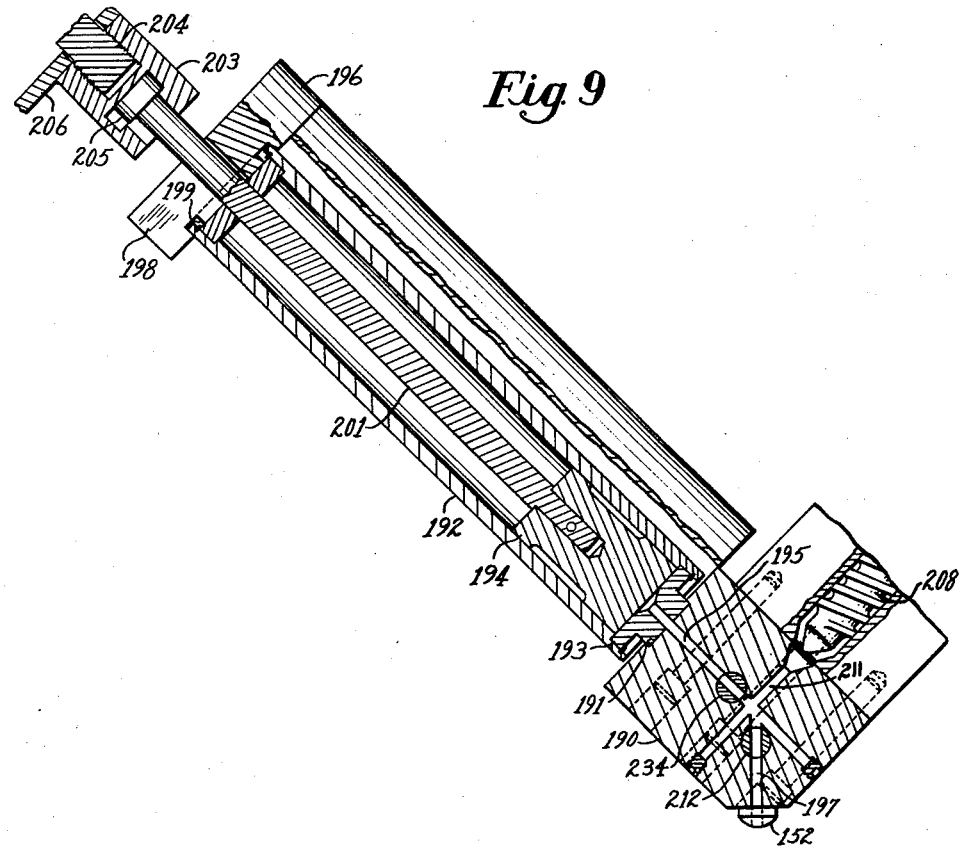
Fig. 9 is an enlarged sectional view taken on the horizontal plane common to the axis of the injection cylinder.
Figure 10:
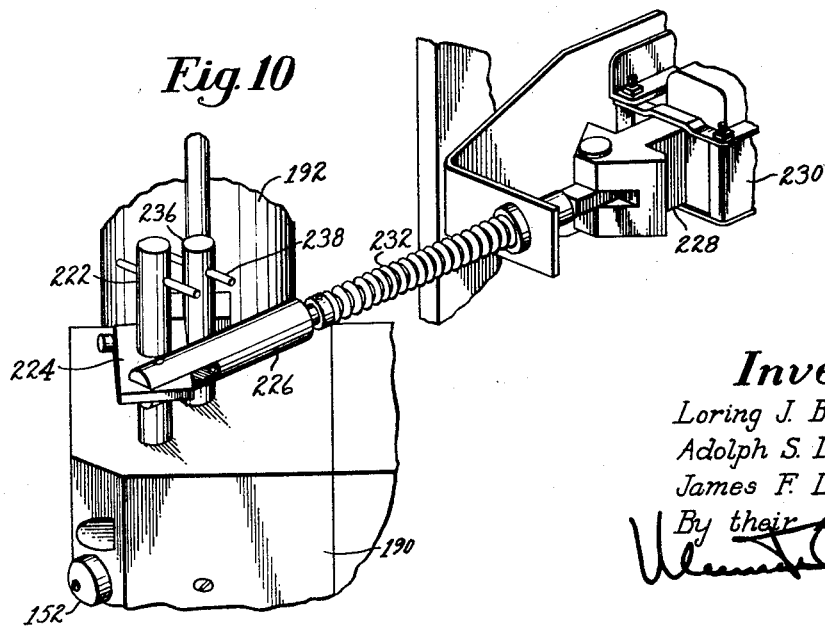
Fig. 10 is an enlarged perspective view illustrating the nozzle block and a valve operating mechanism associated therewith.

The nozzle 152 projects forwardly from the forward edge of a fixed block 190 (Fig. 10) the vertical surfaces of which are disposed diagonally with relation to the cabinet 20. Removably mounted in a counterbore 191 (Fig. 9) in the left rear portion of the block 190 is the reduced portion of a head 193 at the forward end of a cylinder 192 from which resin which has been melted to a fluid condition is forced into a bore 195 in the block 190 by the advancement of a piston 194, said bore 195 communicating with a bore 197 which in turn communicates with the nozzle 152. The rear end portion of the cylinder 192 is mounted in an annular groove 199 formed in a plate 196. In order to provide for the removal of the cylinder 192 and the piston 194 from their mounting for cleaning, the plate 196 is mounted for movement endwise of the cylinder to disengage the cylinder from the groove 199 and the forward portion 201 of the piston rod is movable laterally through an open-ended slot 198 formed in the plate 196. The rear portion 204 of the piston rod is permanently mounted and the forward portion 201 is removably mounted in a head 203 at the forward end of the rear portion 204 of the piston rod. To this end the rear end of the forward portion of the piston rod is provided with a head 205 which is removably secured in a bayonet type connection formed in the head 203. As shown in Fig. 1, the plate 196 is mounted for movement endwise of the cylinder 192 on parallel horizontal rods 200 fixed at their rear ends in the upper portion of a standard 202 and at their forward ends in the block 190. The plate 196 is held in position endwise of the rods 200 by suitable nuts (not shown). The rear portion 204 of the piston rod is slidably mounted in a suitable bearing in the standard 202 and carries at its forward end a forwardly projecting arm 206 for a purpose hereinafter explained. For loading the cylinder 192 the illustrated machine is provided with an extrusion assembly substantially the same as that disclosed in the patent to Ashley et al., hereinbefore referred to, to which patent reference may be had for a description of features of the extrusion mechanism not fully set forth herein. The extruding assembly comprises a screw conveyor 208 (Fig. 9) which receives granulated resin fed by gravity from the a hopper 210 and feeds it through a cylindrical passage into a bore 211 formed in the block and arranged to communicate with the bore 197. Suitable heating means melts the resin to a fluid state during its passage from the hopper to the block 190 and heating elements associated with the block 190 and the cylinder 192 maintain the fluid state of the resin until it is injected into the mold cavity. During the operation of the screw conveyor 208 the bore 197 in the block 190 is kept closed by a rotary valve 212 thus causing fluid resin conveyed by the screw 208 into the bore 211 in the block 190 to pass from the block rearwardly into the cylinder 192 and not through the nozzle 152. The pressure of the fluid in the cylinder 192 causes the retraction of the piston 194. The filling of the cylinder continues until the arm 206 on the piston rod 204 operates a normally closed microswitch 214 (Fig. 1) to open the electric circuit to a motor 251 (Fig. 11) which operates the screw conveyor 208 thus causing the screw conveyor to come to rest and the loading of the cylinder 192 to be terminated. The microswitch 214 is mounted on a bent plate 216 the end portions of which are slidably mounted on the rods 200 to permit adjustment of the microswitch toward and from the arm 206. In order to secure the microswitch in adjusted position the upper rod 200 is threaded and has mounted thereon nuts 218 arranged to engage respectively the front and rear edges of the plate 216. In order to maintain a proper registration between the arm 206 and the plunger of the microswitch 214, a horizontal guide rail 220 is secured to the plate 216 and arranged to extend horizontally forwardly therefrom parallel to the piston rod 204. The arm 206 is held by gravity against the upper edge of the rail 220 and slides upon it during the movements of the piston rod. To provide for the operation of the valve 212 (Fig. 9) which controls the flow of fluid through the bore 197 to the nozzle 152 a stem 222 (Fig. 10) projects upwardly from the valve body through a suitable bore in the block 190 and has fixed to its upper end portion an arm 224 which is connected by a link 226 to the plunger 228 of a solenoid 230. The plunger is operated in one direction by the solenoid to bring the bore 197 in the block 190 into communication with the nozzle 152 and in the opposite direction by a spring 232 on the link 226 to close the bore.

In order to prevent the inadvertent escape of fluid from the block 190 when the cylinder 192 has been removed for cleaning, a valve 234 is mounted in the block and arranged to close the bore 195 through the block to the cylinder. For rotating the valve between its open and closed positions a stem 236 projecting upwardly from the valve is provided with a handle 238.

Figure 11:
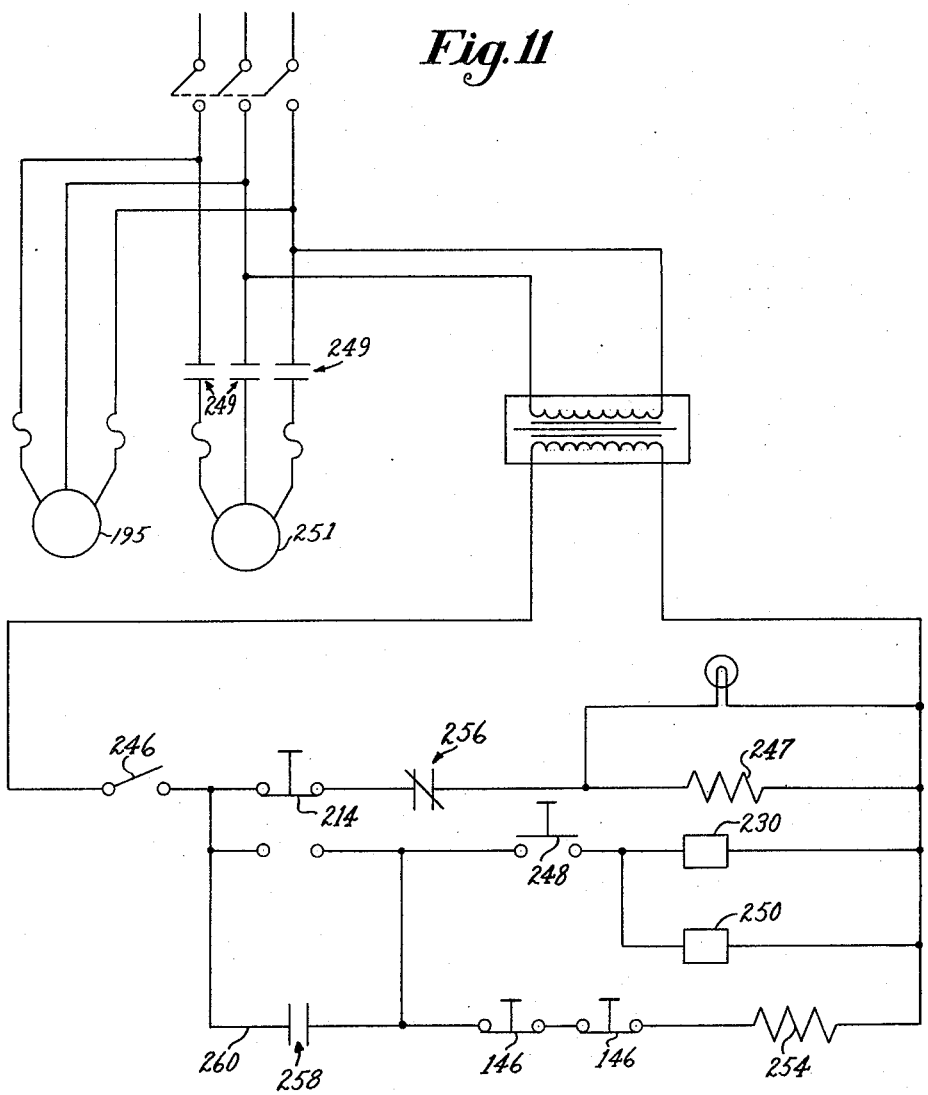
Fig. 11 is an electric wiring diagram.

For actuating the piston 194 a hydraulic pump (not shown) is mounted in the cabinet 20 and conected by suitable tubing (not shown) to a cylinder 240 (Fig. 1) mounted on and projecting rearwardly from the standard 202. The pump is operated by an electric motor 195 (Fig. 11). Slidably mounted in the cylinder 240 is a head (not shown) mounted on the rear end portion of the piston rod 204.

Preparatory to the operation of the illustrated machine, a switch 244 is operated to close an electric circuit to the various heating elements and the temperature of the extrusion cylinder, the block 190 and the cylinder 192 is permitted to increase to a predetermined degree, preferably about 375° F. before initiating the operation of the machine.

In the operation of the machine a shoe such, for example, as the shoe 64 illustrated in Fig. 2, is mounted on one of the shoe forms 66. It will be understood that at the outset both of the shoe forms are located in their respective loading stations and are swung downwardly into loading position and the operator may select either one for mounting the first shoe to be operated upon. After mounting the shoe on the form the operator graps the handles 102 on the jack arm 82 and swings the arm upwardly to present the shoe assembly to the side molds 50 and 52 which, at that time, are in their closed position. The operator, while holding the jack arm with one hand manually adjusts the shoe form 66 with the other hand, as may be required, to establish an accurate registration of the shoe with the side mold members. While holding the jack arm 82 in its upraised position with one hand the operator grasps the hand lever 112 of the latch assembly with the other hand and swings the assembly downwardly to bring the latch lever 104 into latching engagement with the then upper end portion of the jack arm 82. The operator then manually advances the ambulatory assembly from the loading station to the molding station, the position of the assembly in the molding station being determined by the engagement of the pin 178 (Fig. 3) with one of the two screws 180 and 188 in the block 182. The operator then turns the hand screw 156 to swing the ambulatory assembly rearwardly in order to bring the concave end portion of the tube 154 (Fig. 2) forcibly into contact with the complementally shaped convex end portion of the nozzle 152. The operator now operates a switch 246 to close an electric circuit to a coil 247 (Fig. 11) in a relay. The energizing of the coil effects the closing of contacts 249 in a circuit to the motor 251 which actuates the screw conveyor 208 in the extrusion cylinder. Thereupon, granulated resin is fed by gravity from the hopper 210 into the extrusion cylinder through which it is advanced by the screw conveyor and melted to a fluid condition. The operation of the screw conveyor continues until fluid resin has been transmitted from the extrusion cylinder through the block 190 and into the injection cylinder 192. When the injection cylinder becomes fully loaded the arm 206 on the piston rod 204 engages and opens the microswitch 214 to de-energize the coil 247 and thereby to break the circuit to the motor 251 which operates the screw conveyor 208 thus terminating the extruding operation. The operator then presses a push button switch 248 to close a circuit to a solenoid indicated diagrammatically by the numeral 250 in Fig. 11. The operation of the solenoid causes a hydraulic valve (not shown) to open a pressure line to the cylinder 240 in order to effect the advancement of the piston 194 in the injection cylinder. The operation of the switch 248 also closes an electric circuit to the solenoid 230 which operates the valve 212 to open the bore 197 through the block 190 to the nozzle 152. The advancement of the piston 194 causes fluid resin to be forced from the cylinder 192 through the block 190 and through the nozzle 152 into the mold cavity. After the mold has been completely filled further pressure of the piston 194 in the injection cylinder causes a movement of the shoe together with the shoe form and the jack arm 82 relatively to the mold elements thereby causing the latch lever 104 to operate the normally closed microswitch 146 thereby to open the electric circuit to the two solenoids 230 and 250 whereupon a spring (not shown) shifts the hydraulic valve to its exhaust position in order to terminate the advancement of the piston 194 and the spring 232 (Fig. 10) operates the valve 212 in the block 190 to close the bore 197 communicating with the nozzle 152. The operation of the microswitch 146 also de-energizes a coil in a relay, said coil being indicated diagrammatically in Fig. 11, and identified by the numeral 254. The de-energizing of the coil permits a spring (not shown) incorporated in the relay to operate an element in the relay in order to close a contact identified in Fig. 11 by the numeral 256 thereby closing the circuit to the motor 251 which operates the screw conveyor 208. Thereupon, the screw conveyor is again operated to load the injection cylinder 192. The element which closes the contact 256 by the same operation opens a contact 258 in a line 260 thus causing the electric circuit to the solenoids 230 and 250 to remain open after the retraction of the jack arm 82 into its loading position permits the microswitch 146 to close. The hand screw 156 is now released to permit the shoe, together with the jack mechanism, to swing forwardly into its position identified by the location of the roller 48 in Fig. 4, whereupon the ambulatory assembly is returned to the loading station where the fluid resin in the mold cavity is permitted to cool and set to the shape of the mold while a shoe is mounted on the other shoe form and the operation above described is repeated. After the operation on the second shoe has been completed a pneumatic valve (not shown) is operated to cause the pistons 58 to move the side mold members 50 and 52 away from each other into their open position to permit the jack assembly, together with the completed shoe, to be swung downwardly to permit the removal of the shoe from the form preparatory to the mounting on the form of another shoe to be operated upon.

If desired, the shoe form 66 may be omitted and in its place there may be mounted in the channel member 70 a suitable support for a last having a shoe mounted thereon. The provision of a last support in place of the shoe form 66 would obviate the necessity of removing the shoe from the last on which it is shaped and the mounting of the shoe on the metal shoe form 66, and it would also eliminate the necessity of removing the shoe from the metal form immediately after the molding operation.

Having thus described our invention, what we claim as new and desired to secure by Letters Patent of the United States is:

1. In combination, mold elements providing a cavity defining the shape of a shoe bottom member, a shoe support operable to present a shoe thereon to the mold elements, a rail upon which the mold elements and the shoe support move as a unit from a loading station to a molding station, means for forcibly injecting fluid into the cavity, means at the molding station for swinging the mold elements and the shoe support as a unit into position to receive fluid from an injecting means, the rail serving as a fulcrum for such swinging movement, and means operated by the injecting force to move a shoe on the support heightwise thereof relatively to the mold elements thereby to effect the termination of the injecting operation.

2. In combination, mold elements providing a cavity defining the shape of a shoe bottom member, a shoe support constructed and arranged to present a shoe on the support to the mold elements, a rail upon which the mold elements and the shoe support move as a unit from a loading station to a molding station, means for forcibly injecting fluid into the mold cavity, means at the molding station for swinging the mold elements and the shoe support as a unit into position to receive fluid from an injecting means, the rail serving as a fulcrum for such swinging movement, a latch member for holding the work support against the injecting force while the cavity is being filled, and an electric switch operated by a movement of the latch member effected by the injecting force after the cavity has been filled for terminating the injecting operation.

3. The combination with means for charging a mold cavity of an ambulatory assembly and a rail on which the assembly is mounted for movement between a loading station and a charging station, said ambulatory assembly comprising mold members providing a cavity defining the shape of a shoe bottom member, a frame in which the mold members are mounted, a shoe carrier hinged on the frame and means for urging the carrier in a direction to clamp a shoe thereon against the mold members, said means comprising a latch lever which acts on the carrier, a hand lever and means whereby the hand lever operates the latch lever thereby to apply clamping pressure to the carrier, and a microswitch operated by a movement of the latch lever caused by a movement of the carrier effected by movement of the shoe in response to fluid pressure in the mold cavity, the operation of said microswitch causing the termination of the charging of the mold cavity.

4. The combination with means for charging a mold cavity of an ambulatory assembly and a rail on which the assembly is mounted for movement between a loading station and a charging station, said ambulatory assembly comprising a mold member defining the shape of a shoe sole, side mold members, a frame in which the side mold members are mounted for movement toward and from each other, fluid pressure operated pistons for moving the side mold members toward and from each other, a sprue member mounted in the sole mold member, a plastic injection nozzle, and means operating only in the molding station to advance the ambulatory assembly in a direction to bring the sprue member into engagement with the nozzle.

5. The combination with means for charging a mold cavity of an ambulatory assembly and a rail on which the assembly is mounted for movement between a loading station and a charging station, said ambulatory assembly comprising a mold member defining the shape of a shoe sole, side mold members, a frame in which the side mold members are mounted for movement toward and from each other, fluid pressure operated pistons for moving the side mold members toward and from each other, a sprue member mounted in the sole mold member, a plastic injection nozzle, an abutment member for arresting the advancement of the ambulatory assembly upon the rail at a predetermined position in which the sprue member is in registration with the nozzle, and means operating only when the ambulatory assembly is in said predetermined position to advance the ambulatory assembly in a direction to bring the sprue member into engagement with the nozzle.

6. The combination with means for charging a mold cavity of an ambulatory assembly and a rail on which the assembly is mounted for movement between a loading station and a charging station, said ambulatory assembly comprising a mold member defining the shape of a shoe sole, side mold members, a frame in which the side mold members are mounted for movement toward and from each other, fluid pressure operated pistons for moving the side mold members toward and from each other, a sprue member mounted in the sole mold member, a plastic injection nozzle, an abutment member for arresting the advancement of the ambulatory assembly upon the rail at a predetermined position in which the sprue member is in registration with the nozzle, and an actuator which engages the upper portion of the ambulatory assembly only when the assembly is in said predetermined position and operates to swing the assembly on an axis substantially coincidental with the rail, thereby to bring the sprue member into engagement with the nozzle.

References Cited in the file of this patent

UNITED STATES PATENTS

| | | |
|---|---|---|
| 1,770,655 | Nielsen | July 15, 1930 |
| 2,433,132 | Lester | Dec. 23, 1947 |
| 2,470,089 | Booth | May 17, 1949 |
| 2,589,323 | Ashley et al. | Mar. 18, 1952 |
| 2,757,414 | Chaloupka | Aug. 7, 1956 |